(12) United States Patent
Wechgeln

(10) Patent No.: US 6,931,163 B1
(45) Date of Patent: Aug. 16, 2005

(54) METHOD FOR CONVERTING THE COORDINATES OF IMAGE DATA BY WAY OF RANDOM OFFSET OF THE PICTURE ELEMENTS

(75) Inventor: Jörg Olaf von Wechgeln, Wattenbek (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/646,502

(22) PCT Filed: Mar. 2, 1999

(86) PCT No.: PCT/DE99/00540

§ 371 (c)(1),
(2), (4) Date: Nov. 3, 2000

(87) PCT Pub. No.: WO99/48047

PCT Pub. Date: Sep. 23, 1999

(30) Foreign Application Priority Data

Mar. 19, 1998 (DE) .............................. 198 12 028

(51) Int. Cl.[7] .......................................... G06K 15/00
(52) U.S. Cl. .................... 382/293; 358/3.03; 358/3.19
(58) Field of Search ............................. 382/166, 216, 382/277, 285, 293, 295, 298; 358/3.03, 3.04, 358/3.05, 3.14, 3.19, 3.26, 518, 463, 471

(56) References Cited

U.S. PATENT DOCUMENTS 4,674,107 A * 6/1987 Urban et al. .................. 378/98

| | | | | |
|---|---|---|---|---|
| 4,692,810 A | * | 9/1987 | Machii et al. | 358/400 |
| 4,767,121 A | * | 8/1988 | Tonner | 473/141 |
| 4,916,545 A | | 4/1990 | Granger | 358/456 |
| 4,977,458 A | | 12/1990 | Granger et al. | 358/456 |
| 5,222,206 A | * | 6/1993 | Liao | 395/131 |
| 5,485,174 A | * | 1/1996 | Henshaw et al. | 345/684 |

(Continued)

FOREIGN PATENT DOCUMENTS

DE    42 06 277    6/1993

(Continued)

OTHER PUBLICATIONS

William F. Schreiber—Fundamentals of Electronic Imaging Systems—Third Edition—Springer-Verlag.

*Primary Examiner*—Jerome Grant II
(74) *Attorney, Agent, or Firm*—Schiff Hardin LLP

(57) ABSTRACT

In a method for converting the coordinates of image data, the positions of new picture elements in a new coordinate system are calculated by means of coordinate transformation equations from the positions of initial picture elements in an initial coordinate system. The positions of the new picture elements are randomly modified in a variation range around the positions calculated by way of the coordinate transformation. For this purpose, random values are added to the calculated coordinates of the new picture elements. The method can be used in case of scale conversions, image rotation, etc. to improve the quality of the converted image. The method avoids both the corruption of the image structures caused by coordinate conversion and the formation of disruptive moire patterns. The method can be combined with known methods for calculating the color values of the new picture elements, such as the nearest-neighbor method or the interpolation method.

11 Claims, 5 Drawing Sheets

U.S. PATENT DOCUMENTS

| | | | | |
|---|---|---|---|---|
| 5,608,822 | A | 3/1997 | Carlebach | 382/270 |
| 5,622,470 | A * | 4/1997 | Schaefer et al. | 414/807 |
| 5,657,047 | A | 8/1997 | Tarolli | 345/127 |
| 6,448,971 | B1 * | 9/2002 | Seefeldt | 345/475 |
| 6,708,265 | B1 * | 3/2004 | Black | 711/207 |
| 6,731,400 | B1 * | 5/2004 | Nakamura et al. | 358/1.9 |

FOREIGN PATENT DOCUMENTS

| | | |
|---|---|---|
| EP | 0 369 301 | 5/1990 |
| EP | 0 696 017 | 6/1996 |
| EP | 0 803 841 | 10/1997 |
| JP | 9-128528 | 5/1997 |

* cited by examiner

METHOD FOR CONVERTING THE COORDINATES OF IMAGE DATA BY WAY OF RANDOM OFFSET OF THE PICTURE ELEMENTS

BACKGROUND OF THE INVENTION

The invention is in the field of digital image processing and is directed to a method for converting image data of an image onto a different coordinate system, for example onto a different size or onto a different resolution or the calculation of a rotated or perspectively distorted image. Coordinate conversions for image data are employed in all fields of employment of digital image processing.

Electronic reproduction technology is an important field of employment, whereby extremely large sets of image data are processed. In reproduction technology, print masters are produced for printing pages that contain all elements to be printed such as texts, graphics and images. In the case of electronic production of print masters, these elements are present in the form of digital data. The data are generated for an image, for example, in that the image is scanned point-by-point and line-by-line in a scanner, each picture element is resolved into color components, and the color values of these components are digitalized. Images are usually resolved into the color components red, green and blue (RGB) in a scanner. For four-color printing these components are then transformed further into the printing inks cyan, magenta, yellow and black (CMYK).

During the course of further work, the digitalized texts, graphics and images are assembled in a processing station to form a printing page either under visual control on a color monitor or automatically according to stored layout rules. The printing page is then written in a data format, for example in the page description language PostScript, and is stored. In order to produce a printing plate for each printing ink, the printing page data are composed of color separation data for respectively one of the printing inks CMYK. The color separation data are recorded in extremely high resolution on film material or directly on printing plates with a film or, respectively, plate recorder. There are also digital printing machines that work without printing plates. In this case, the color separation data are transmitted directly to the digital printing machine and are printed out thereat on the material to be printed.

For recording on film material or printing plates, the color separation data are converted into high-resolution bit map data in a raster image processor (RIP), whereby screen dots of different size are generated for the different density values of the colors. The result is a high-resolution, binary image that now has only two brightness values per picture element (black or, respectively, white). In English-language usage, such an image is also referred to as a "bit map" and is also referred to as "Strichbild" in German usage.

A resolution for images that is standard in reproduction technology is, for example, twelve picture elements/mm (300 picture elements/inch). When four color values are stored (CMYK) per picture element and the densities of the color values are digitized with respectively eight bits (equal one byte), then a data set of $$210\ mm \times 297\ mm \times 12 \times 12 \times 4 = 35{,}925{,}120\ \text{bytes} \qquad (1)$$

derives from an image having a size of DIN A4, i.e. approximately 36 megabytes. The bit map data are produced in a significantly higher resolution in the raster image processor, for example with 100 picture elements/mm (2540 picture element/inch). However, each picture element is digitalized with one bit since it can only assume two brightness values. A data set of $$210\ mm \times 297\ mm \times 100 \times 100 \times \tfrac{1}{8} \times 4 = 311{,}850{,}000\ \text{bytes} \qquad (2)$$

thus derives for the four color separation data of a DIN A4 printing page, i.e. approximately 312 megabytes. These datasets are also multiplied by the number of pages in a printed product. Extremely large data sets must thus be processed in electronic reproduction technology. The employment of effective processing methods therefore plays a great part.

It often occurs in reproduction technology that digital image data must be converted onto a different image size (upon retention of the resolution) or onto a different resolution (upon retention of the image size). The same problem is to be solved in both instances of scale conversion. Using a given number of picture elements per image line and a given number of picture lines, a different number of picture elements per image line and a different number of image lines must be calculated. The color values of the newly calculated picture elements must be defined from the corresponding picture elements of the original image such that the image quality of the converted image does not suffer. The methods known from the prior art are extremely time-consuming for the large image data sets in reproduction technology. Original image structures can be falsified in the converted image and disturbing patterns (Moirè) can also arise, specifically in the scale conversion of screened bit map data.

SUMMARY OF THE INVENTION

It is therefore an object of the present invention to avoid the disadvantages of the known methods for coordinate conversion of images and to specify an effective and qualitatively good method that produces no disturbing patterns. According to the method of the present invention for converting coordinates of image data, positions of new picture elements in a new coordinate system are calculated with coordinate transformation equations from positions of original picture elements and an original coordinate system. The positions of the new picture elements are randomly modified around the positions calculated with the coordinate transformation.

The invention is described in greater detail below on the basis of FIGS. 1 through 8.

The coordinate conversion in all methods of the prior art occurs in two steps. In the first step, the positions of the picture elements to be re-calculated are defined in relation to the positions of the original picture elements. In the second step, the color values of the new picture elements are calculated from the color values of the original picture elements that are adjacent to the positions of the new picture elements. These two steps are explained below with reference to the example of a scale conversion.

Figure 1:
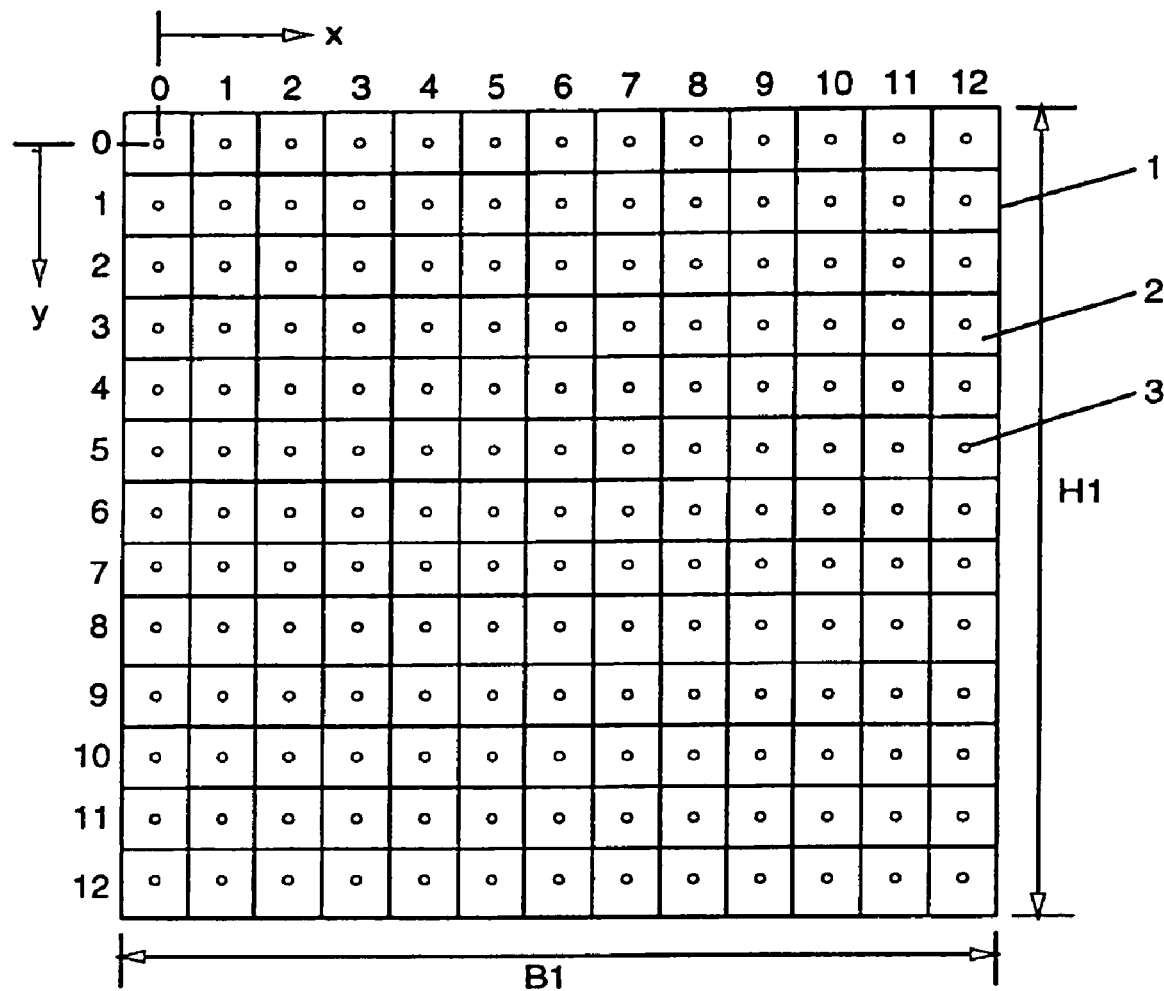
FIG. 1 shows an example of an original image having a specific number of image lines and picture elements per image line.

FIG. 1 shows an example of an original image 1 with thirteen image lines and thirteen picture elements per image line that is to be converted in scale. For reasons of simplified presentation, the image is selected square. In general, images are not square and, accordingly, have a different and far, far higher number of image lines and picture elements per image line. In the example, the image area having the width B1 and the height H1 is divided into 13×13 sub-areas that correspond to the picture elements 2. The color value of a picture element represents the color value of the image in the corresponding sub-area. In the center of each picture element, a point 3 identifies the position of the picture element in an x, y-coordinate system. The image lines and the picture elements in an image line are respectively consecutively numbered from 0 to 12. The first picture element in the first image line lies in the coordinate origin 0,0. With a given resolution of R picture elements/mm, the dimensions of the image derive as B1=13/R mm and H1=13/R mm.

DESCRIPTION OF THE PREFERRED EMBODIMENTS

The image of FIG. 1 is to be converted, for example, to 10×10 picture elements, i.e. with a scale factor of S=10/13. Whether the image is thereby reduced is dependent on the resolution with which it is reproduced. With an unmodified resolution, the reduced dimensions B2=10/R mm and H2=10/R mm would result. Given reproduction with, for example, a coarser resolution, it can even become larger despite the lower number of picture elements. A scale conversion can therefore not always be equated with a modification of the dimensions. The crux of the scale conversion, however, is that a new image having a different number of image lines and picture elements per image line is generated in every instance.

Figure 2:
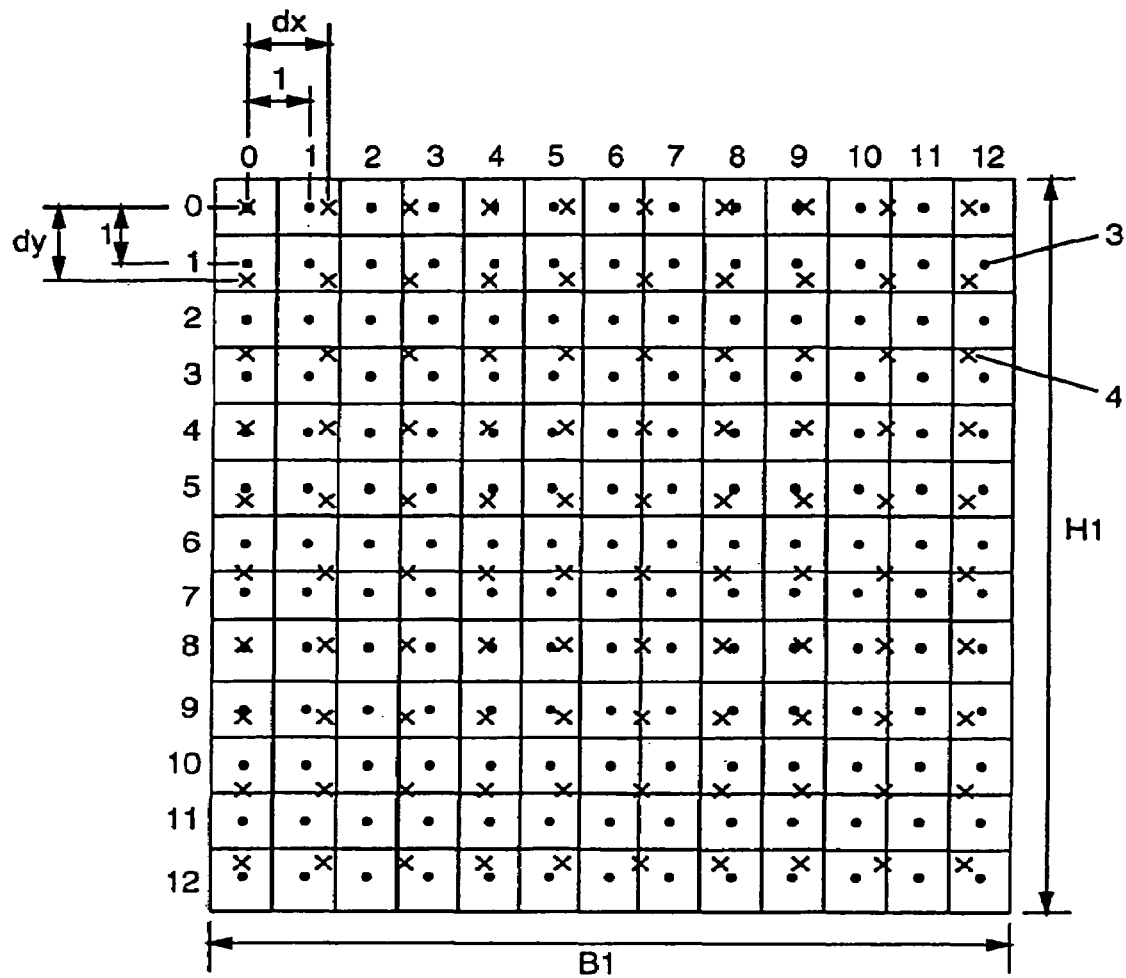
FIG. 2 shows the positions of the newly calculated picture elements in the original image.

FIG. 2 shows the re-calculated picture elements 4 in relationship to the original image. Their positions are identified with a cross. The first picture element in the first line of the newly calculated image is likewise placed into the origin of the x, y-coordinate system. For determining the positions of the new picture elements, the new picture elements are uniformly distributed onto the image area. When the spacing of the original picture elements in x-direction and y-direction is respectively assumed to be one, the image has the area 13×13 in these units. In order to cover the same area with ten picture elements per image line and with ten image lines, the new picture elements must have greater spacings dx or, respectively, dy. The spacing dx of the new picture elements in line direction derives from the relationship of the old number of picture elements per image line to the new number of picture elements per image line, i.e. dx=13/10=1/S. In the example, the spacing of the new image lines likewise derives as dy=13/10=1/S. Different scale factors Sx or, respectively, Sy can be selected for the x-direction and the y-direction. The spacings of the new picture elements then derive as $$dx=1/Sx \text{ or } dy=1/Sy \qquad (3)$$

The x-position x(n) of the $n^{th}$, new picture element in a new image line and the y-position y(m) of the $m^{th}$, new image line are then $$x(n)=n \times dx=n \times 1/Sx$$
$$y(m)=m \times dy=m \times 1/Sy \qquad (4)$$

In a universal coordinate conversion, the positions u(n) and v(m) of the new picture elements in a new coordinate system (u, v) are calculated with coordinate transformation equations fu(x, y) and fv(x,y) as function of the coordinates of the original picture elements in an original coordinate system (x, y).

$$u(n)=fu(x, y)$$
$$v(m)=fv(x,y) \qquad (5)$$

Figure 3:
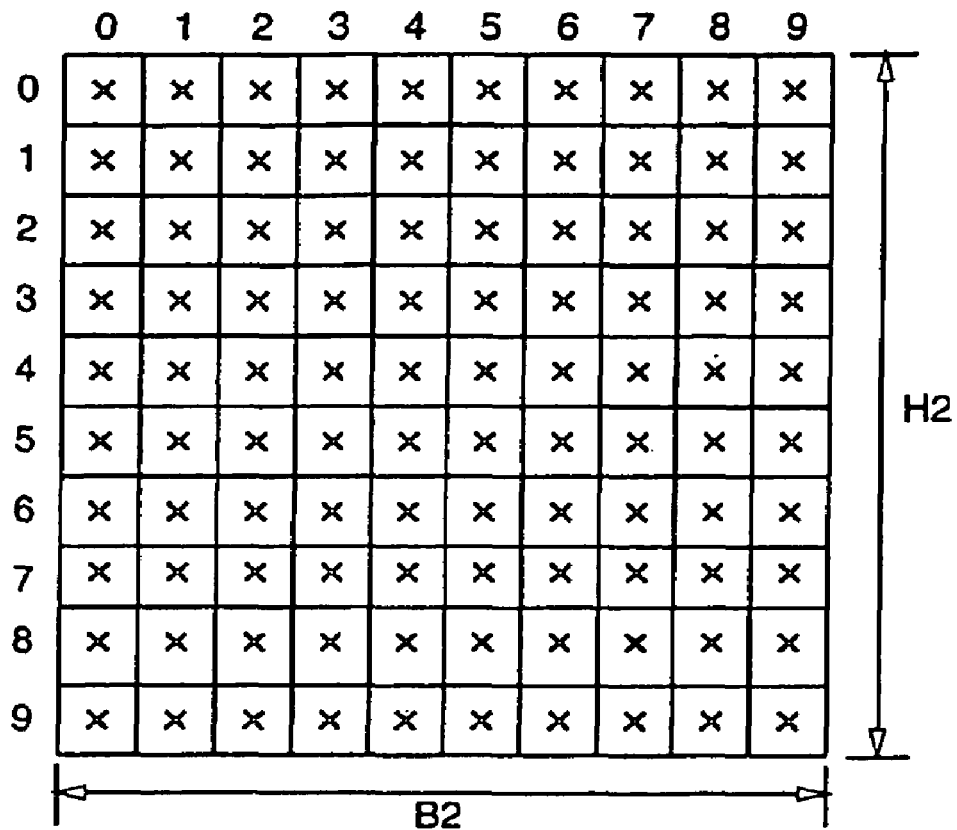
FIG. 3 shows the converted image having a diminished plurality of image lines and picture elements per image line.

For this example, FIG. 3 shows the image after the scale conversion when it is reproduced with the same resolution R of picture elements/mm as the original image. A reduced image having the dimensions B2=10/R mm and H2=10/R mm is then obtained.

In a second step of the scale conversion of the prior art, the color values of the new picture elements are then calculated according to various methods from the color values of the original picture elements that are adjacent to the positions of the new picture elements. In the simplest case, the color value of a new picture element is equated with the color value of the original picture element that lies closest to the new picture element. This method is known as the "nearest neighbor" method. Specifically for large image data sets, it has the advantage that it can be implemented very fast, but has the disadvantage that structures of the original image are falsified and disturbing patterns can be produced. In the example of FIG. 2, the original image lines or, respectively, image columns 2, 6 and 11 are not covered by the nearest neighbor method, i.e. fine image structures in these lines or, respectively, columns that are only one picture element wide are lost in the scale conversion. Moreover, the image lines or, respectively, image columns that are not covered occur with regular spacings, as a result whereof a disturbing pattern (Moirè) can be produced. Given a scale conversion for enlarging the number of new picture elements and the number of new image lines, the new picture elements lie closer together than the original picture elements. In this case, some image lines or, respectively, image columns are doubly acquired by the nearest neighbor method. The original image structures are also falsified as a result thereof and disturbing patterns can be produced.

These disturbing effects can be alleviated when the color values of the new picture elements are interpolated by weighted addition of the color values of a number of neighboring, original picture elements. This known method, however, is calculation-intensive and is therefore less suited for large image data sets. Moreover, disturbing patterns can also not always be avoided therewith. United States Letters Patent U.S. Pat. No. 5,657,047 discloses such a method for scale modification of the picture screen display of an image. The weighted addition of the color values of a number of neighboring, original picture elements is referred to therein as "blending". The Patent also discloses a circuit-oriented realization of the interpolation that manages with a slight memory expense.

Methods are also known specifically for binary images having only two brightness values (bit map images) wherein the original picture elements in the environment of a new picture element are analyzed with methods of pattern recognition. The color value of the new picture element is determined from the result of the analysis, whereby, for example, an attempt is made to preserve fine image structures that would be lost given a pure nearest neighbor method or would be highly falsified. These methods of pattern recognition also require a high calculating outlay per picture element and are therefore too time-consuming for large image data sets.

The described disadvantages—falsification of image structure and formation of disturbing patterns—are avoided by the inventive method without having to greatly increase the calculating outlay per picture element. It is therefore also suitable for extremely large image data sets as occur in electronic reproduction technology. This is achieved by a new way of determining the positions for the new picture elements. This new way of determining the positions can be combined with all known methods of calculating the color values for the new picture elements (nearest neighbor method, interpolation, pattern recognition).

Figure 4:
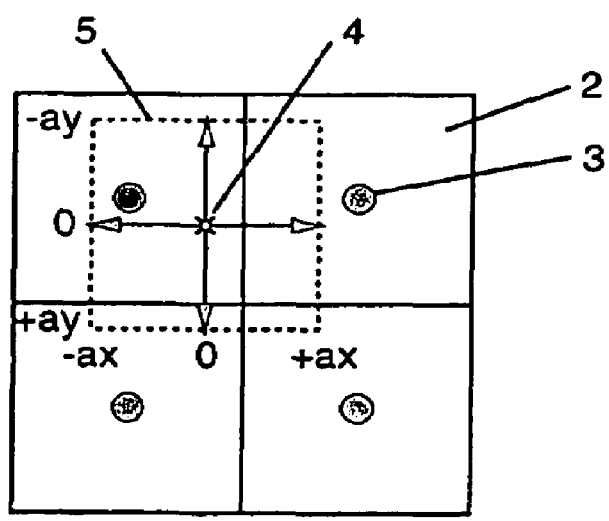
FIG. 4 illustrates the range of variation for the position of a new picture element in relationship to the neighboring, original picture elements.

FIG. 4 shows an excerpt of 2×2 neighboring, original picture elements 2 and the position of a new picture element 4 as derives according to the above-explained method of position identification from the spacings dx and dy between the new picture elements. According to the invention, the position of the new picture element is randomly modified in a range 5 of variation around this position. For this purpose, a random value having a numerical range from −ax through +ax can be added to the x-coordinate of the position, and a random value having a numerical range from −ay through +ay can be added to the y-coordinate of the position. As a result of this technique, the position of the new picture element is shifted with a certain probability into the area of the one original picture element on the one hand or into the area of the other original picture element on the other hand. When the color value of the new picture element is subsequently calculated, for example according to the nearest neighbor method, individual image lines or, respectively, image columns of the original image cannot be entirely lost (given reduction) or, respectively, they are not doubled in terms of their entire length (given enlargement). Further, picture elements are no longer omitted or, respectively, doubled at regular intervals, as a result whereof the formation of disturbing patterns is avoided. In conjunction with the calculation of the color values of the new picture elements with interpolation from the neighboring, original picture elements, disturbing residual patterns are avoided since it is not always the same neighboring points of the original image that are utilized for the interpolation in a line or, respectively, column.

The range of variation 5 is expediently selected in such a size that it covers approximately one-half through one picture element spacing of the original image. It also need not be symmetrical around the position of the new picture elements. It can be selected arbitrarily asymmetrically or such that only positive or negative random values are added to the coordinates of the picture element position.

Figure 5:
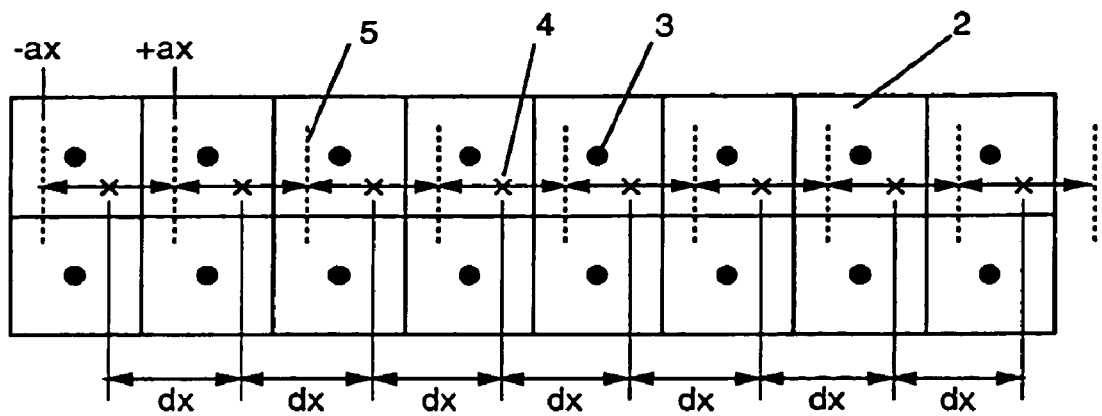
FIG. 5 illustrates the range of variation for the position of a line of new picture elements in relationship to the neighboring, original picture elements.

FIG. 5 shows a simplified embodiment of the inventive method wherein new random values need not be produced for each new picture element. In this embodiment, all new picture elements of a new image line are shifted in position by the same random value in the x-direction, whereby the picture elements retain their fixed spacing dx from one another. A new random value is produced for each new image line. Likewise, all new picture elements of a new image column can be shifted in position by the same random value in the y-direction, whereby the picture elements retain their fixed spacing dy relative to one another. In this way, new random values need only be generated at the start of each image line or, respectively, image column, as a result whereof the processing time is substantially shortened. Expediently, the shift of the image lines in the x-direction and of the image columns in the y-direction are combined with one another.

The generation of the random values can occur with a known random value generator during the processing. In order to save processing time, a list of random values can also be produced in advance and can be stored in one or more tables, for example, one table for the x-direction and one table for the y-direction. During the scale conversion, the respectively required random value is continuously read from the corresponding table.

The present invention was explained with reference to the example of scale conversion. However, the application thereof is not limited thereto. It can be applied in any type of coordinate conversion for image data such as, for example, rotation of an image by an arbitrary angle, perspective distortion of an image, imaging of an image onto a curved surface in space, etc. Such complex coordinate conversions play a part in many areas of digital image processing, for example in the presentation of three-dimensional objects or in the distortion correction of aerial and satellite pictures. As in the simple scale conversion, there is also the problem given these complex coordinate conversions that original image structures are falsified in the new image and disturbing patterns can arise. As in the scale conversion, the positions of the new picture elements in a new coordinate system are determined with coordinate transformation equations in a first step in the complex coordinate conversions, whereby the new picture element positions lie between the original picture elements. In this first step, the present invention can be applied for avoiding disturbing effects. In a second step, the color values are then calculated from the original picture elements, that lie in the environment of a new picture element, as in the scale conversion.

Figure 6:
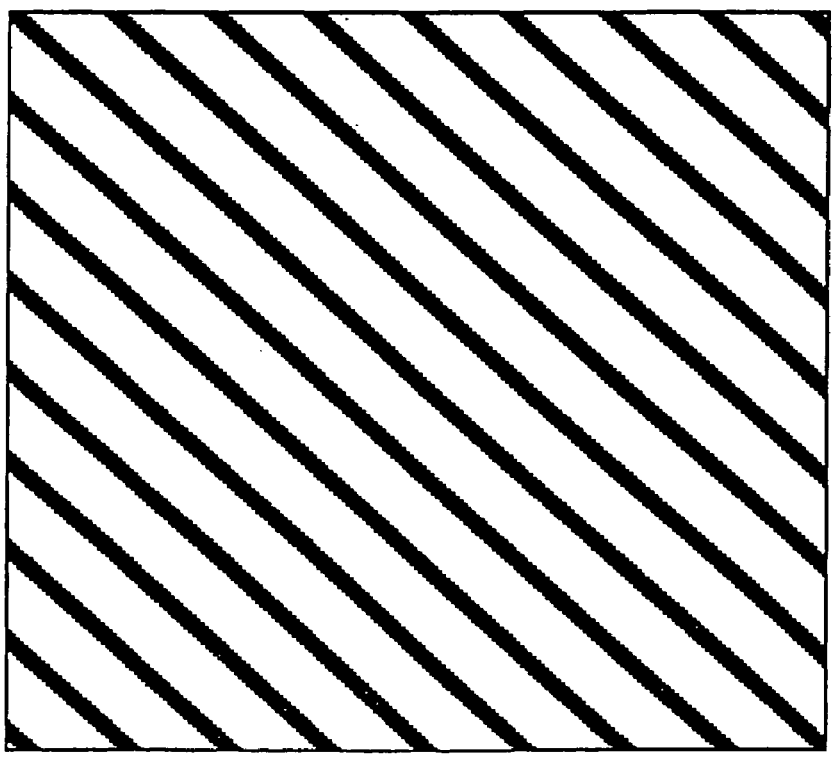
FIG. 6 is an example of an original image.
Figure 7:
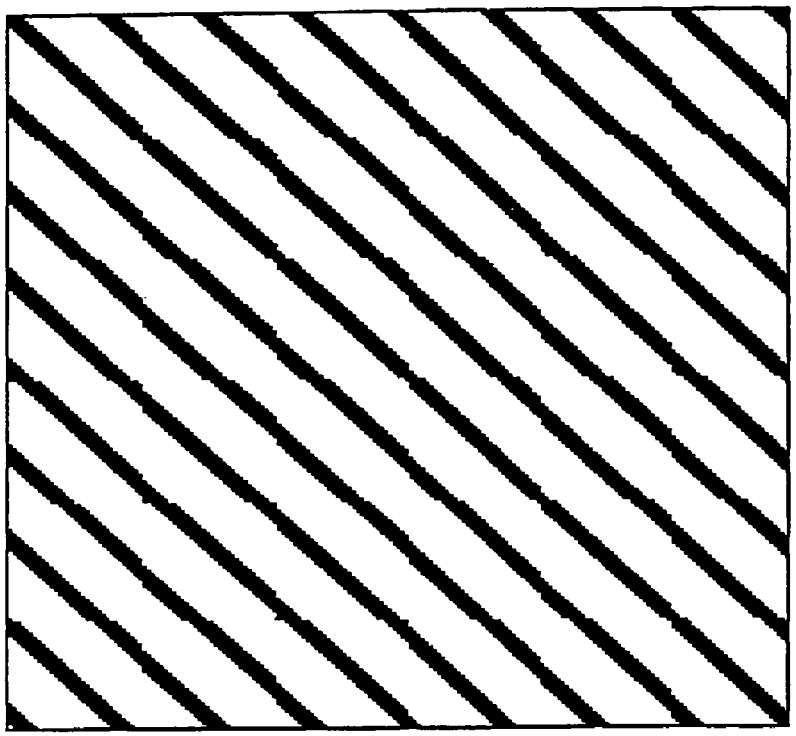
FIG. 7 shows the reduced, original image without application of the inventive method.
Figure 8:
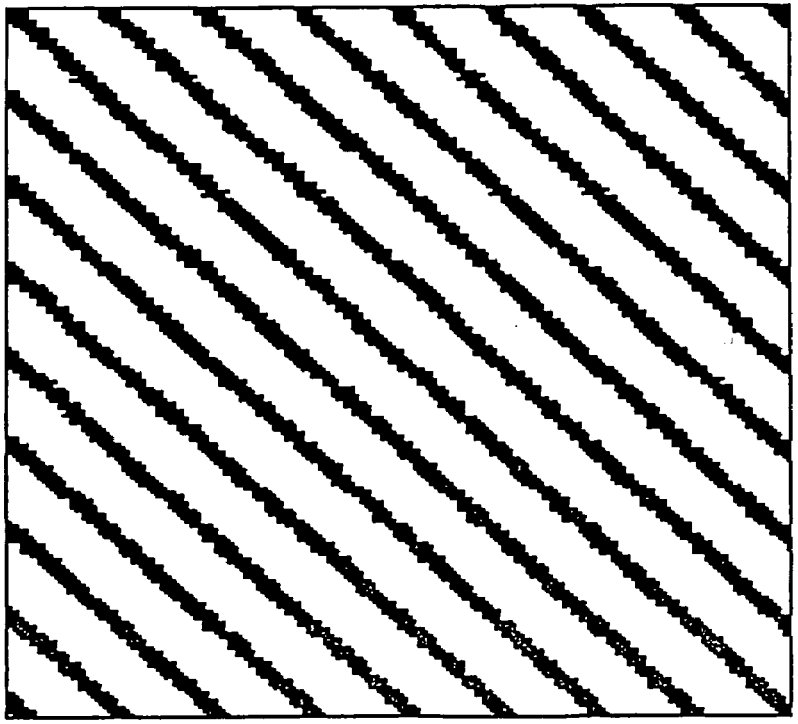
FIG. 8 illustrates the reduced, original image with application of the inventive method.

The effect of the invention is illustrated with reference to the example of a simple, binary image in FIGS. 6 through 8. FIG. 6 shows an enlarged portion from an original image having a diagonal stripe pattern. FIG. 7 shows the image reduced to 97% without application of the inventive method, whereby the brightness values of the new picture elements were determined according to the nearest neighbor method. One can clearly see the omitted image lines and image columns that generate a disturbing box pattern. FIG. 8 shows the reduced image with application of the inventive method. The box pattern no longer occurs. Due to the random shift of the new picture elements, the edges of the diagonal stripes have become somewhat rougher. Given the high resolution of images, particularly in reproduction technology, this effect, however, is far less disturbing then the regular patterns that are generated without the application of the invention.

Although various minor changes and modifications might be proposed by those skilled in the art, it will be understood that my wish is to include within the claims of the patent warranted hereon all such changes and modifications as reasonably come within my contribution to the art.

I claim:

1. A method for converting position coordinates of image data, comprising the steps of:
   calculating positions of new picture elements in a new position coordinate system with coordinate transformation equations from positions of original picture elements in an original position coordinate system; and randomly modifying the positions of the new picture elements around the positions calculated with the coordinate transformation equations.

2. The method according to claim 1 wherein the random modification of the positions of the new picture elements is applied in a scale conversion of the image data.

3. The method according to claim 1 wherein the random modification of the positions of the new picture elements is applied in an arbitrary coordinate transformation of the image data.

4. The method according to claim 1 wherein the image data represent binary images with two color steps per picture element.

5. The method according to claim 1 wherein the image data represent images having an arbitrary number of color steps per picture element.

6. A method for converting coordinates of image data, comprising the steps of:
   calculating positions of new picture elements in a new coordinate system with coordinate transformation equations from positions of original picture elements in an original coordinate system;
   randomly modifying the positions of the new picture elements around the positions calculated with the coordinate transformation equations; and
   modification of the positions of the new picture elements occurs by addition or subtraction of random values to or from the calculated coordinates of the new picture elements.

7. The method according to claim 6 wherein new random values are added or subtracted for each new picture element.

8. The method according to claim 6 wherein a same random value is added or subtracted for all new picture elements of a coordinate direction.

9. A method for converting coordinates of image data, comprising the steps of:
   calculating positions of new picture elements in a new coordinate system with coordinate transformation equations from positions of original picture elements in an original coordinate system;
   randomly modifying the positions of the new picture elements around the positions calculated with the coordinate transformation equations; and
   color values of the new picture elements are set equal to color values of closest neighboring original picture elements.

10. A method for converting coordinates of image data, comprising the steps of:
    calculating positions of new picture elements in a new coordinate system with coordinate transformation equations from positions of original picture elements in an original coordinate system;
    randomly modifying the positions of the new picture elements around the positions calculated with the coordinate transformation equations; and
    color values of the new picture elements are calculated by interpolation from color values of neighboring, original picture elements.

11. A method for converting coordinates of image data, comprising the steps of:
    calculating positions of new picture elements in a new coordinate system with coordinate transformation equations from positions of original picture elements in an original coordinate system;
    randomly modifying the positions of the new picture elements around the positions calculated with the coordinate transformation equations;
    the modification of the positions of the new picture elements occurring by addition or subtraction of random values to or form the calculated coordinates of the new picture elements; and
    the random modification of the positions of the new picture elements being applied in an arbitrary coordinate transformation of the image data.

* * * * *